Sept. 28, 1937.   F. J. ZIKA ET AL   2,094,514
SIGNAL DEVICE
Filed June 30, 1936   2 Sheets-Sheet 1
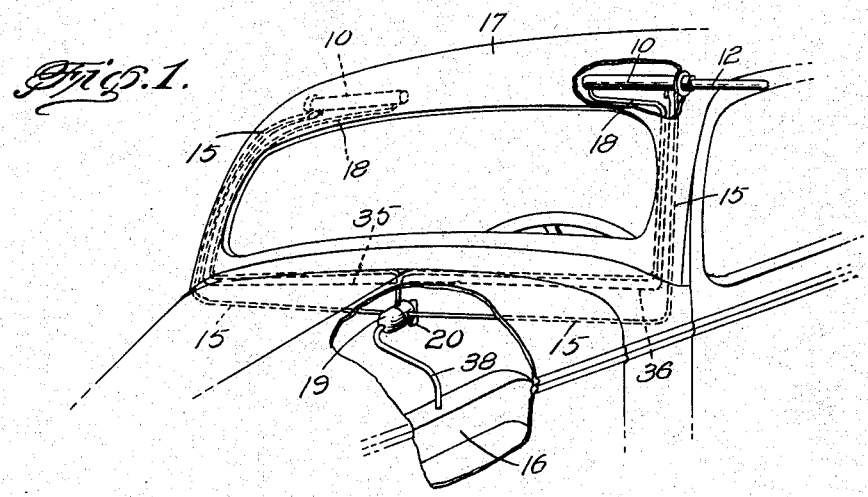
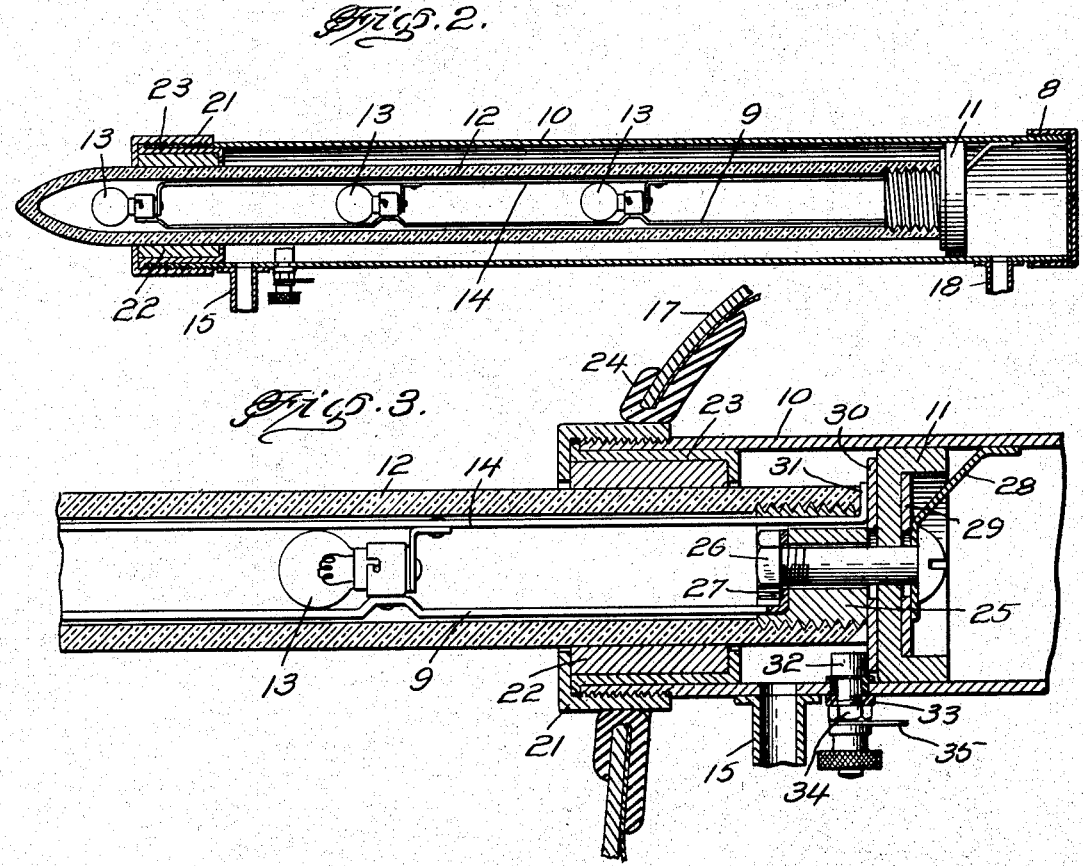
Frank J. Zika
Herman Ewert,
INVENTOR
BY Victor J. Evans & Co.
ATTORNEY Sept. 28, 1937.  F. J. ZIKA ET AL  2,094,514
SIGNAL DEVICE
Filed June 30, 1936   2 Sheets-Sheet 2
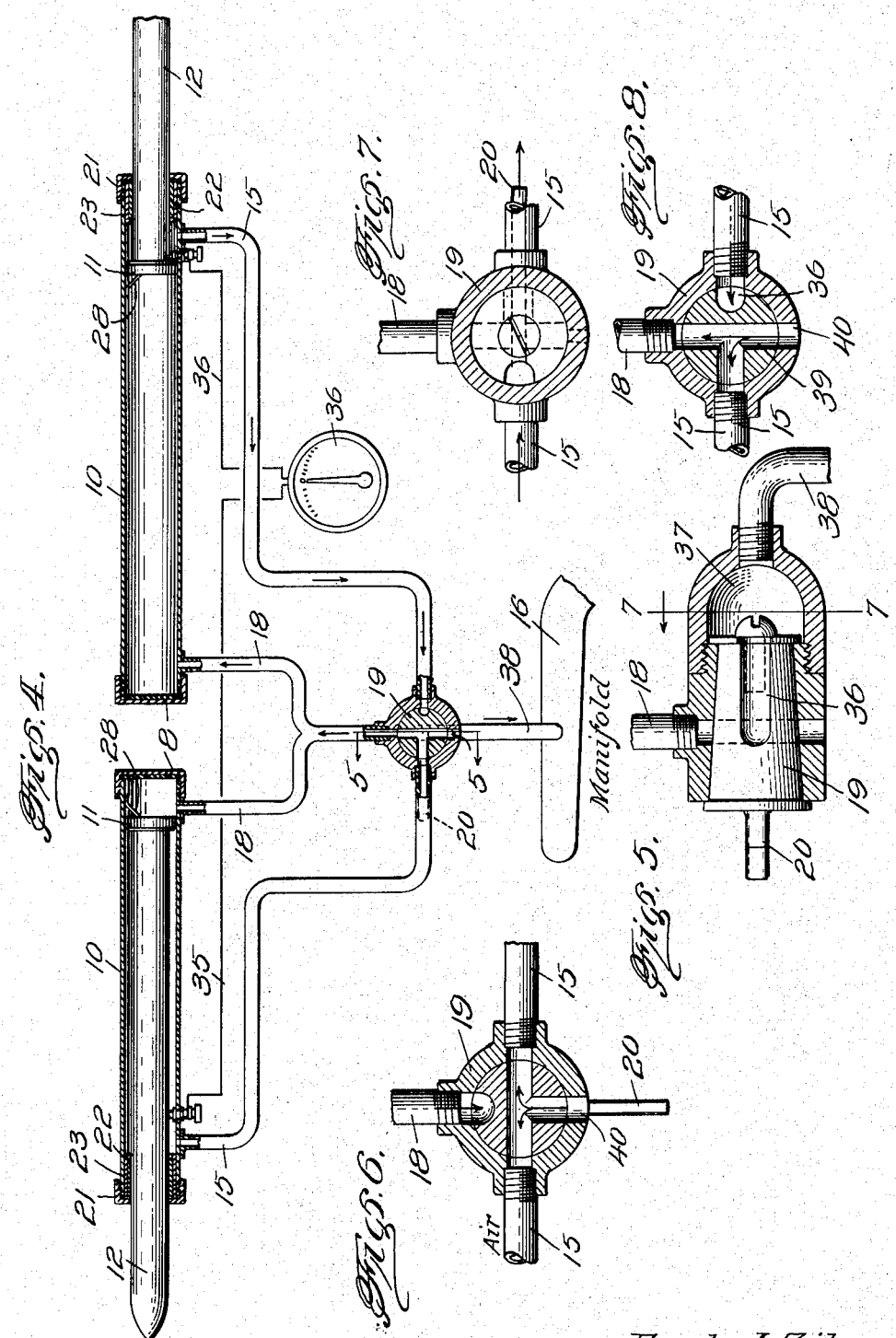

Patented Sept. 28, 1937

2,094,514

UNITED STATES PATENT OFFICE 2,094,514

SIGNAL DEVICE

Frank J. Zika and Herman W. Ewert, Chicago, Ill.

Application June 30, 1936, Serial No. 88,241

1 Claim. (Cl. 177—329)

This invention relates to signal devices for motor vehicles and has for an object to provide a device of this character including a piston chamber and a piston therein, the piston stem of which is a transparent carrier for a plurality of spaced electrically energized lamps which may be successively brought into view as the stem of the piston is projected beyond the piston chamber.

A further object is to provide a novel valve for controlling a vacuum in one end of the piston chamber co-incident with air pressure in the other end of the chamber whereby the illuminated piston stem may be projected to operative position or withdrawn to neutral position.

A still further object is to provide a signal of this character which may be conveniently installed or built into motor vehicles so as to be concealed when not in use and which will be formed of a few strong simple and durable parts, which will be easy to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawings forming part of this specification,

Figure 1 is a fragmentary perspective view of a motor vehicle equipped with a signal device constructed in accordance with the invention.

Figure 2 is an enlarged longitudinal sectional view through the piston chamber, piston, and transparent piston rod.

Figure 3 is an enlarged detail longitudinal sectional view of the piston chamber, piston and piston rod and showing the electrical connections of the lamps housed in the transparent piston rod.

Figure 4 is a diagrammatic view of the various parts of the apparatus showing the controlling valve turned to project the rod of one of the pistons to operative position.

Figure 5 is a detail sectional view taken on the line 5—5 of Figure 4.

Figure 6 is a cross sectional view showing the valve in neutral position.

Figure 7 is a cross sectional view showing the valve in position to project the left piston rod or signal.

Figure 8 is a detail sectional view showing the valve in position to project the right piston rod or signal.

Referring now to the drawings in which like characters of reference designate similar parts in the various views, 10 designates a cylindrical piston chamber within which works a piston 11, the piston rod 12 of which is tubular and is preferably formed of transparent material. A plurality of lamp bulbs 13 are housed within the piston rod and are connected in parallel with conductor wires 14 and 9, as best shown in Figures 2 and 3.

The piston 11 is subjected to a differential air pressure through a pipe 15 which enters the outer end of the piston chamber and is connected to a control valve 19 and from thence to the intake manifold 16 of the vehicle engine. When the atmospheric air pressure is admitted the piston rod 12 is thrust outwardly from the piston chamber to successively expose the lamps 13 which shine through the hollow transparent piston rod and provide a visible warning of the driver's intention to make a turn. There are two of these piston chambers and piston rods employed, one on the left side and one on the right side of the vehicle roof 17 to correspond to the intended turn to be made.

Atmospheric pressure enters behind the piston 11 through a pipe 18 which is connected to the atmosphere through a three-way control valve 19, as shown in Figures 4 to 8 inclusive, to move the piston and project the transparent piston rod from the piston chamber. Said valve reverses the vacuum and air pressure so that the vacuum will act through the pipe 18 to withdraw the piston rod into the piston chamber while atmospheric air will act behind the piston through the pipe 15 to accomplish withdrawal of the piston rod into the piston chamber.

The valve is preferably located underneath the cowl upon the rear of the instrument board and is provided with a handle 20 for turning the valve to neutral or to right or left signal operating positions.

The outer end of each piston chamber is closed by a screw cap 21 and the inner end is closed by a screw cap 8. The chamber is sealed gastight at the outer end by a gasket 22 confined in a gasket retainer 23. A rubber strip 24 is folded to straddle the opening in the car roof in which the chamber is mounted and bears against the screw cap 21 to prevent rattles and prevent drafts.

The inner end of each piston chamber is closed by a threaded insulating tube 25 through which a bolt 26 is passed. The bolt 26 clamps the upturned end 27 of the ground wire 9 to the tube and clamps a brush 28 to the piston, the brush bearing upon the metal wall of the piston chamber. A washer 29 of insulating material insulates the brush from the piston. A metal contact washer 30 loosely surrounds the bolt and the upturned end 31 of the live wire 14 is clamped by the threaded tube 25, between the transparent piston rod and the contact washer 30. A terminal 32 is disposed in the path of the contact washer 30 and is insulated from the piston chamber by an insulating bushing 33. The terminal is integral with a binding post 34 to which a wire 35 is connected. The wires 35 of both signal devices are connected to the ammeter 36, as best shown in Figure 4.

When the piston 11 is moved to its outer limit of movement the contact washer 30 will engage the terminal 32 whereupon a circuit may be traced through the wire 35, terminal 32, contact washer 30, live wire 14, signal bulbs 13, ground wire 9, bolt 26, brush 28, to the metal piston chamber 10 which is grounded on the body of the car. The lights will thus be energized when the piston is at its outer limit of movement and when the piston is withdrawn the above traced circuit will be broken as the washer 30 leaves the contact 32 to extinguish the bulbs.

The above mentioned control valve 19 is of the three-way type as shown and is provided in one side with a passage 36, best shown in Figure 5, which communicates with the chamber 37 in the valve housing, which chamber is connected to the intake manifold by a pipe 38. The other end of the passage may be brought selectively into registration with the ports in the housing which communicate with the pipes 18 and 15.

As shown in Figures 5 to 8 inclusive, the T-shaped air passage 39 of the valve may selectively be brought into registration with the pipe 18 of either the right or the left piston chamber and with an air port 40 in the valve, to admit air to the piston chamber on one side of the piston while simultaneously the vacuum passage 36 may be brought into registration with the pipe 15 of the selected piston chamber to subject the other side of the piston to vacuum for projecting the piston rod to signaling position. Reversal of this valve reverses the air and vacuum on the piston to withdraw the piston rod to neutral position.

While vacuum and atmospheric pressure has been described as operating simultaneously against opposite sides of the piston, it is to be understood that a variation in pressure against opposite sides of the piston is all that is necessary, so that such variation will cause movement of the piston in a direction toward the lesser of the two.

From the above description it is thought that the construction and operation of the invention will be fully understood without further explanation.

What is claimed is:

A plunger type, laterally movable signal mechanism comprising, a metal cylinder, a hollow transparent tube forming a lamp housing and slidable into and out of said cylinder, a composite piston and insulating plug structure for closing the inner end of said tube, illuminating means supported within said tube, means for projecting said tube into signaling position, and means carried by said plug structure and said cylinder, respectively, for completing a circuit through the illuminating means only when said tube is projected into signaling position, said circuit completing means constituting also an abutment to limit the outward movement of said tube.

FRANK J. ZIKA.
HERMAN W. EWERT.